United States Patent
NguyenLoc et al.

(10) Patent No.: US 9,976,444 B2
(45) Date of Patent: May 22, 2018

(54) TURBINE ENGINE TRANSMISSION GUTTER

(71) Applicant: United Technologies Corporation, Farmington, CT (US)

(72) Inventors: Fred NguyenLoc, San Diego, CA (US); San Quach, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days. days.

(21) Appl. No.: 15/196,091

(22) Filed: Jun. 29, 2016

(65) Prior Publication Data

US 2016/0305282 A1 Oct. 20, 2016

Related U.S. Application Data

(62) Division of application No. 13/603,252, filed on Sep. 4, 2012, now Pat. No. 9,404,381.

(51) Int. Cl.
*F01D 25/18* (2006.01)
*F01D 15/12* (2006.01)
(Continued)

(52) U.S. Cl.
CPC .............. *F01D 25/18* (2013.01); *F01D 15/12* (2013.01); *F01D 25/24* (2013.01); *F16H 57/045* (2013.01);
(Continued)

(58) Field of Classification Search
CPC .......... F01D 15/12; F01D 25/18; F01D 25/20; F04D 19/002; F04D 25/028;
(Continued)

(56) References Cited

U.S. PATENT DOCUMENTS

| 2,984,975 A | 5/1961 | Rodgers et al. |
| 4,089,665 A | 5/1978 | Brookman |

(Continued)

FOREIGN PATENT DOCUMENTS

| EP | 1612437 A1 | 1/2006 |
| EP | 1923540 A1 | 5/2008 |

(Continued)

OTHER PUBLICATIONS

International Search Report and Written Opinion for PCT/US2013/053144, dated Nov. 5, 2013.

(Continued)

*Primary Examiner* — Logan Kraft
*Assistant Examiner* — Danielle M Christensen
(74) *Attorney, Agent, or Firm* — Bachman & LaPointe, P.C.

(57) ABSTRACT

A turbine engine case defines a centerline and a gaspath within the engine case. A fan is coupled to a fan shaft. A transmission couples the shaft to the fan shaft to drive the fan and comprises a gear system. A gutter system is positioned to capture lubricating fluid slung from the gear system. The gutter system includes a gutter extending partially circumferentially about the centerline having a first circumferential end edge. An inlet channel has an inlet at the gutter first circumferential end edge and locally radially outboard of the gutter. At least one vane is spaced apart from the gutter first circumferential end edge.

18 Claims, 11 Drawing Sheets

(51) Int. Cl.
*F01D 25/24* (2006.01)
*F16H 57/04* (2010.01)
*F16N 31/02* (2006.01)

(52) U.S. Cl.
CPC ..... *F16H 57/0409* (2013.01); *F16H 57/0423* (2013.01); *F16H 57/0441* (2013.01); *F05D 2260/602* (2013.01); *F16N 31/02* (2013.01)

(58) Field of Classification Search
CPC ............. F04D 29/063; F05D 2260/602; F05D 2260/40311; F05D 2260/98; F16N 31/02; F16N 2031/025
See application file for complete search history.

(56) References Cited

U.S. PATENT DOCUMENTS

| | | | |
|---|---|---|---|
| 4,153,141 A | 5/1979 | Methlie | |
| 4,309,870 A | 1/1982 | Guest et al. | |
| 4,741,630 A * | 5/1988 | Oeynhausen | F01D 11/00 384/144 |
| 4,782,658 A | 11/1988 | Perry | |
| 5,433,674 A | 7/1995 | Sheridan et al. | |
| 5,472,383 A | 12/1995 | McKibbin | |
| 6,223,616 B1 | 5/2001 | Sheridan | |
| 6,996,968 B2 | 2/2006 | Peters et al. | |
| 7,326,142 B2 | 2/2008 | Asahi et al. | |
| 7,377,098 B2 | 5/2008 | Walker et al. | |
| 8,020,665 B2 | 9/2011 | Sheridan et al. | |
| 8,051,869 B2 | 11/2011 | Pamin et al. | |
| 2008/0044276 A1 | 2/2008 | McCune et al. | |
| 2008/0110699 A1* | 5/2008 | Munson | F01D 25/183 184/6.11 |
| 2008/0110813 A1 | 5/2008 | Munson | |
| 2008/0116009 A1 | 5/2008 | Sheridan et al. | |
| 2008/0116010 A1 | 5/2008 | Portlock et al. | |
| 2009/0183950 A1* | 7/2009 | Brouillet | F01D 25/20 184/6.24 |
| 2010/0212281 A1 | 8/2010 | Sheridan | |
| 2010/0294371 A1 | 11/2010 | Pamin et al. | |
| 2010/0294597 A1 | 11/2010 | Pamin | |
| 2011/0108360 A1* | 5/2011 | DiBenedetto | F01D 25/18 184/6.11 |
| 2012/0324899 A1 | 12/2012 | DiBenedetto et al. | |

FOREIGN PATENT DOCUMENTS

| | | |
|---|---|---|
| EP | 2322766 A2 | 5/2011 |
| EP | 2559913 A1 | 2/2013 |

OTHER PUBLICATIONS

European Search Report for EP13835636.5, dated Sep. 30, 2015.
U.S. Office Action for U.S. Appl. No. 13/603,252, dated Dec. 16, 2015.

* cited by examiner

TURBINE ENGINE TRANSMISSION GUTTER

CROSS-REFERENCE TO RELATED APPLICATION

This is a divisional application of U.S. patent application Ser. No. 13/603,252, filed Sep. 4, 2012, and entitled "Turbine Engine Transmission Gutter", the disclosure of which is incorporated by reference herein in its entirety as if set forth at length.

BACKGROUND

The disclosure relates to gas turbine engines. More particularly, the disclosure relates to lubrication of fan drive gear systems in gas turbine engines.

Typical gas turbine engines have one or more turbine sections driving one or more compressor sections. The one or more turbine sections may also drive a fan. Many engines have an equal number of turbine and compressor sections (typically two). An exemplary such engine involves a low pressure turbine (LPT) section coupled to a low pressure compressor (LPC) section to drive the low pressure compressor section. Similarly, a high pressure turbine (HPT) section is coupled to a high pressure compressor (HPC) section to drive the high pressure compressor. In such situations, the fan is typically driven by the LPT. The rotating components of the LPT and LPC are commonly designated a low pressure spool while the rotating components of the HPT and HPC are commonly designated a high pressure spool. In such or other engines, the fan may be driven via a transmission (typically a gear reduction so that the fan is driven at a lower rotational speed than its driving spool).

An exemplary transmission is a fan drive gear system (FDGS) formed as an epicyclic geared transmission. With a typical fan at the front of an engine, the transmission is typically positioned between the fan and the LPC.

For lubricating the transmission, one or more supply pumps supply lubricating liquid (e.g., oil) to the fan drive gear system and one or more scavenge pumps typically scavenge the lubricating liquid from the fan drive gear system. If the scavenged lubricating liquid is highly aerated, a small scavenge pump may not be suitable to scavenge the lubricating liquid from the fan drive gear system, thus causing flow to back up and potentially lead to oil leakage, excess heat generation, and low oil quantity alarms. If a larger scavenge pump is used, that can add weight and take additional space, which is undesirable in systems where weight and space are a premium.

Exemplary lubrication systems, components, and methods of use are disclosed in US Pregrant Publications: 2008/0116010A1 entitled "Lubrication System with Tolerance for Reduced Gravity"; 2010/0212281A1 entitled "Auxiliary Pump System for Fan Drive Gear System"; 2010/0294597A1 entitled "Windmill and Zero Gravity Lubrication System"; 2010/0294371A1 entitled "Gravity Operated Valve"; and 2011/0108360A1 entitled "Oil Capture and Bypass System"; and 2008/0116009A1 entitled "Lubrication System With Extended Emergency Operability"; and U.S. Ser. No. 13/165,967, filed Jun. 22, 2011 entitled "Oil Bypass Channel Deaerator for a Geared Turbofan Engine". The foregoing publications and application are incorporated by reference in their entireties herein as if set forth at length.

SUMMARY

One aspect of the disclosure involves a gutter system for capturing lubricating fluid slung from a gear system. The gutter system includes a gutter extending partially circumferentially about a centerline having a first circumferential end edge. An inlet channel has an inlet at the gutter first circumferential end edge and locally radially outboard of the gutter. At least one vane is spaced apart from the gutter first circumferential end edge.

In additional or alternative embodiments of any of the foregoing embodiments, the at least one vane may be exactly two vanes. The at least one vane may be at least two vanes. The at least two vanes may be positioned with a leading vane and a trailing vane. The leading vane may have an outboard edge and the trailing vane may have an outboard edge radially recessed relative to the leading vane outboard edge. The trailing vane may be spaced apart from both the leading vane and away from the scroll wall. The trailing vane may be spaced apart from the leading vane and the gutter first circumferential end/edge by 1-4 times a thickness of the trailing vane.

In additional or alternative embodiments of any of the foregoing embodiments, the at least one vane may be positioned with a chord oriented with a component from an outboard edge to an inboard edge circumferentially in the same direction as an inlet flow direction.

In additional or alternative embodiments of any of the foregoing embodiments the gutter system may be installed in an engine. An engine case defines a centerline and a gaspath within the engine case. A fan is coupled to a fan shaft. A transmission couples the shaft to the fan shaft to drive the fan and comprises a gear system. The gutter system is positioned to capture lubricating fluid slung from the gear system.

In additional or alternative embodiments of any of the foregoing embodiments, the transmission may be an epicyclic transmission.

In additional or alternative embodiments of any of the foregoing embodiments, the gutter may comprise a flange. The engine may comprise an auxiliary lubricant tank. An outlet of the inlet channel to the auxiliary lubricant tank may be along the flange.

In additional or alternative embodiments of any of the foregoing embodiments, the at least one vane may be oriented to inwardly deflect a tangential flow passing along a leading face without tangentially reversing the flow.

In additional or alternative embodiments of any of the foregoing embodiments, the engine may have at least one compressor section, a combustor, and at least one turbine section. The shaft may be coupled to the turbine section. The at least one compressor section may comprise a high pressure compressor section and a low pressure compressor section. The at least one turbine section may comprise a high pressure turbine section and a low pressure turbine section. The shaft may be a low pressure turbine shaft coupling the low pressure turbine section to the low pressure compressor section. A high pressure shaft may couple the high pressure turbine section to the high pressure compressor section.

Another aspect of the disclosure involves a method for operating any of the foregoing embodiments. The lubricating fluid is flung with a tangential/circumferential velocity component in a first direction. A portion of the flung lubricating fluid flows in the first direction along an inboard surface of the gutter. A portion of the lubricating fluid flowing along the gutter inboard surface passes into the inlet of the inlet channel.

In additional or alternative embodiments of any of the foregoing embodiments, as the portion of the lubricating fluid flowing along the gutter inboard surface passes into the inlet of the inlet channel a first of the at least one vane diverts a relatively air-rich portion away from the inlet and then a second of the at least one vane diverts a relatively air-rich portion of the remainder away from the inlet.

In additional or alternative embodiments of any of the foregoing embodiments, as the portion of the lubricating fluid flowing along the gutter inboard surface passes into the inlet of the inlet channel, the at least one vane diverts a relatively air-rich portion away from the inlet.

Another aspect of the disclosure involves a gutter system for capturing lubricating fluid slung from a gear system. The gutter system includes a gutter extending partially circumferentially about a centerline having a first circumferential end edge. An inlet channel has an inlet at the gutter first circumferential end edge and locally radially outboard of the gutter. Means are circumferentially ahead of the first circumferential end edge for diverting gas from a tangential flow of the slung lubricating fluid.

In additional or alternative embodiments of any of the foregoing embodiments, the means comprises at least one vane positioned to divert a relatively gas-rich inboard portion of the tangential flow from a relatively gas-poor outboard portion.

In additional or alternative embodiments of any of the foregoing embodiments, the vane is positioned to pass said relatively gas-poor outboard portion to the inlet where a relatively gas-rich portion thereof is diverted by the first circumferential end edge so that a relatively gas-poor portion thereof is passed through the inlet.

In additional or alternative embodiments of any of the foregoing embodiments, the gutter system may be installed in an engine. An engine case defines a centerline and a gaspath within the engine case. A fan is coupled to a fan shaft. A transmission couples the shaft to the fan shaft to drive the fan and comprises a gear system. The gutter system is positioned to capture lubricating fluid slung from the gear system.

The details of one or more embodiments are set forth in the accompanying drawings and the description below. Other features, objects, and advantages will be apparent from the description and drawings, and from the claims.

Figure 6:
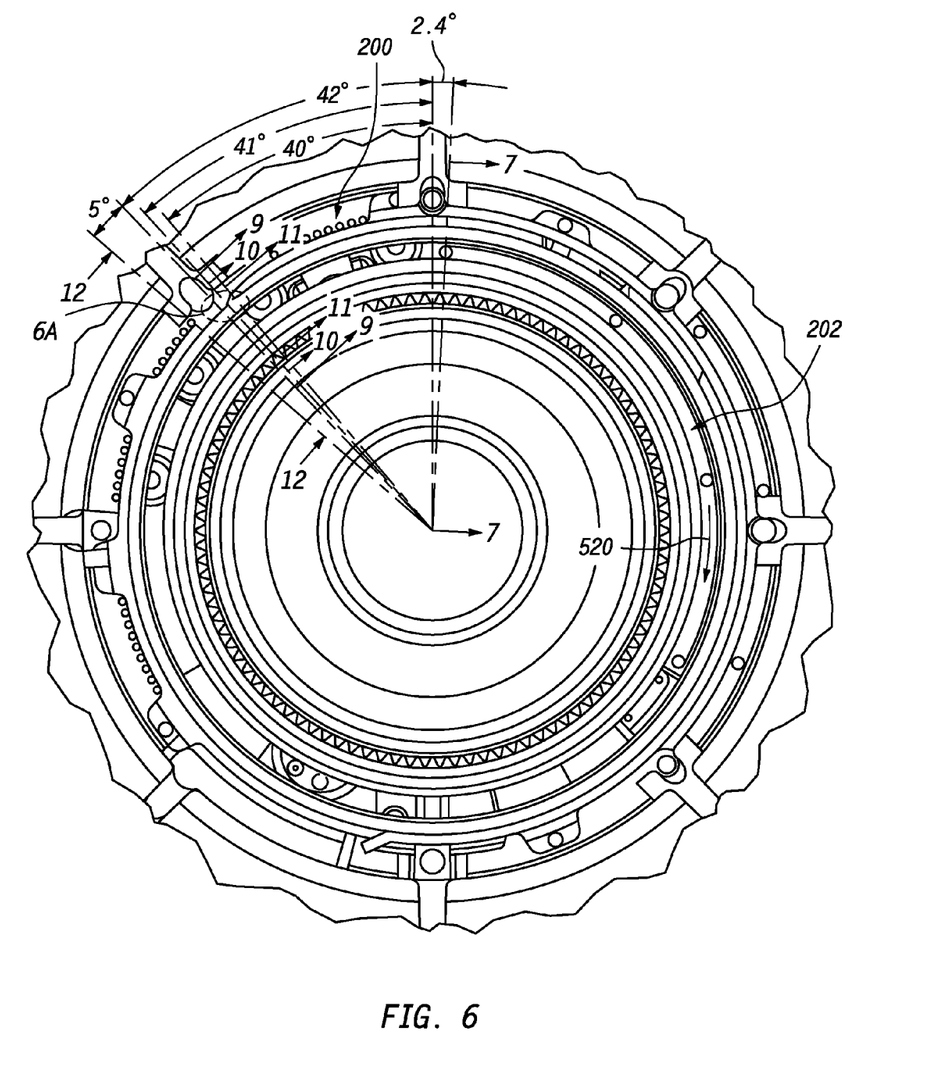
FIG. 6 is a partial forward-looking transverse cutaway view of a second oil capture and bypass system.
Figure 9:
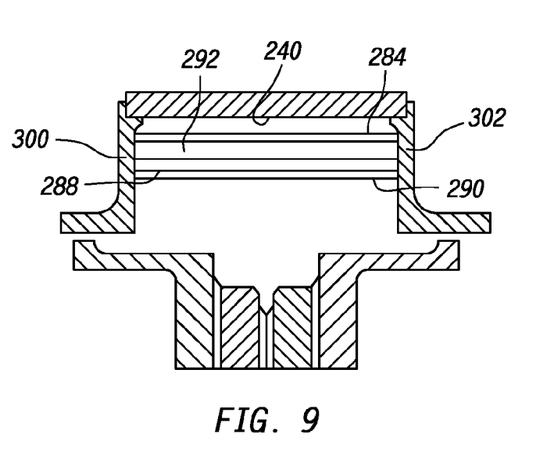
FIG. 9 is a partial cutaway view of the gutter taken along line 9-9 of FIG. 6.
Figure 10:
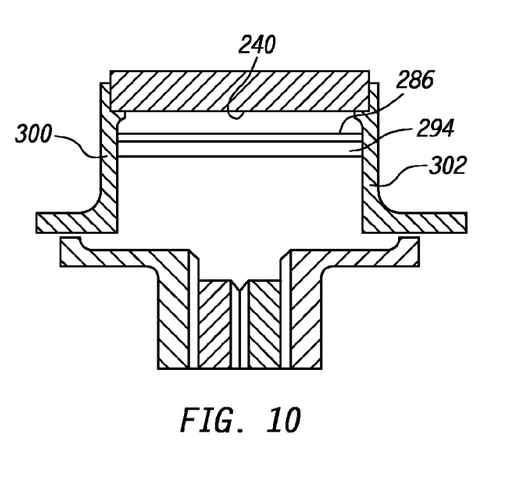
FIG. 10 is a partial cutaway view of the gutter taken along line 10-10 of FIG. 6.
Figure 11:
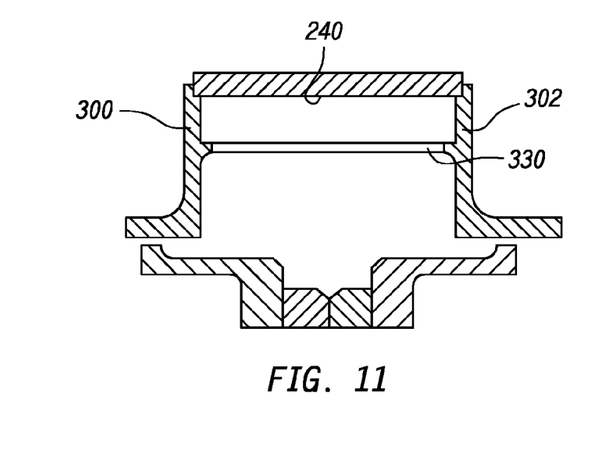
FIG. 11 is a partial cutaway view of the gutter taken along line 11-11 of FIG. 6.
Figure 12:
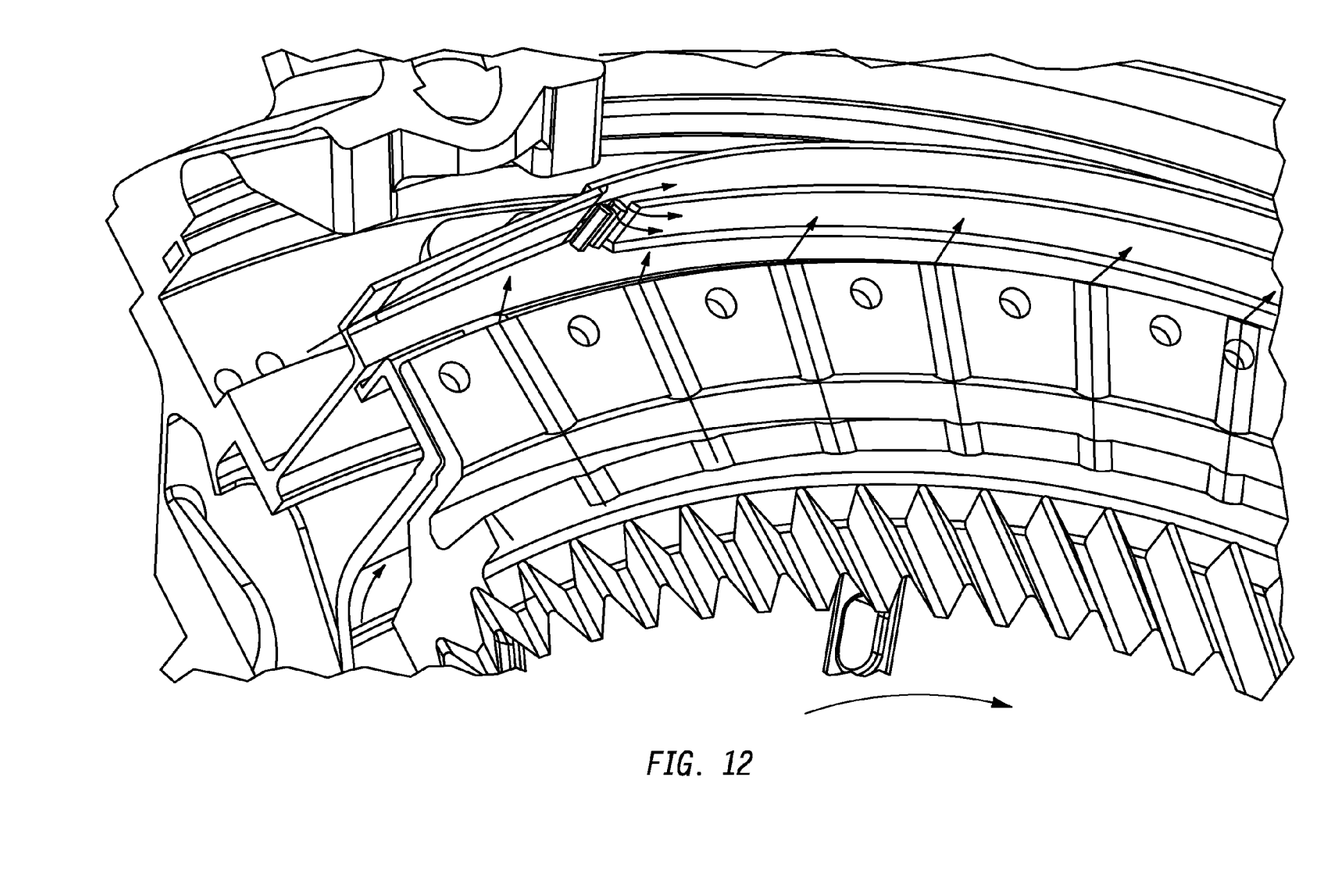
FIG. 12 is a partial cutaway view of the gutter taken along line 12-12 of FIG. 6.

Various of the drawings reflect artifacts of computer generation. For example, although sectioning planes are shown in FIG. 6 for each of FIGS. 9-11, the view is not necessarily normal thereto (rendering it more of a cutaway than a section). Additionally, some background details are suppressed.

Like reference numbers and designations in the various drawings indicate like elements.

DETAILED DESCRIPTION

Figure 1:
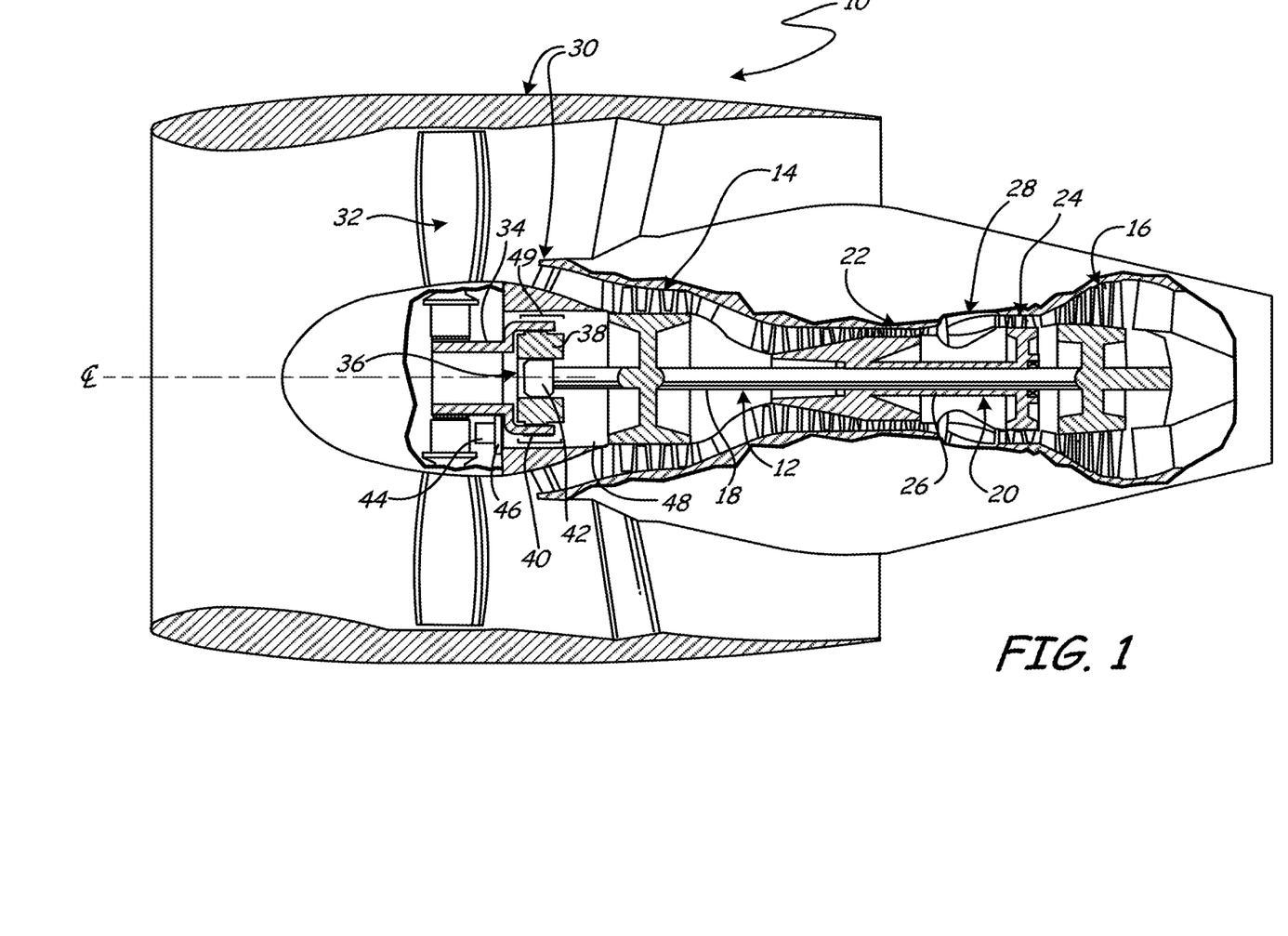
FIG. 1 is a schematic cross-sectional side view of a gas turbine engine with a fan drive gear system.

FIG. 1 is a schematic cross-sectional side view of gas turbine engine 10. Gas turbine engine 10 includes low pressure spool 12 (which includes low pressure compressor (LPC) 14 and low pressure turbine (LPT) 16 connected by low pressure shaft 18), high pressure spool 20 (which includes high pressure compressor (HPC) 22 and high pressure turbine (HPT) 24 connected by high pressure shaft 26), combustor 28, nacelle 30, fan 32, fan shaft 34, and fan drive gear system 36 (which includes star gear 38, ring gear 40, and sun gear 42). Low pressure spool 12, high pressure spool 20, fan shaft 34, and fan drive gear system 36 all rotate substantially around centerline axis $C_L$ defined by/within the engine main case. The LPC, HPC, combustor, HPT, and LPT are sequentially along a core gaspath through the engine main case. The fan directs an inlet flow to be split between the gaspath and a bypass flowpath surrounding the main case.

The general construction and operation of gas turbine engines is well-known in the art, and therefore detailed discussion here is unnecessary. However, a more detailed understanding of fan drive gear system 36 can be helpful. As shown in FIG. 1, low pressure spool 12 is coupled to fan shaft 34 via fan drive gear system 36. In the illustrated embodiment, fan drive gear system 36 is a "star gear system". Sun gear 42 is attached to and rotates with low pressure shaft 18. Ring gear 40 is rigidly connected to fan shaft 34 which turns at the same speed as fan 32. Star gear 38 is coupled between sun gear 42 and ring gear 40 such that star gear 38 revolves about its axis, when sun gear 42 rotates. When low pressure spool 12 rotates, fan drive gear system 36 causes fan shaft 34 to rotate at a slower rotational velocity than that of low pressure spool 12. This allows fan 32 and low pressure spool 12 to rotate at different speeds for improved operation of both fan 32 and low pressure spool 12. In an alternative embodiment, fan drive gear system 36 can be a "planetary gear system". In a planetary gear system, ring gear 40 is fixed and fan shaft 34 is attached to a carrier (not shown) that carries star gear 38 (also called a planet gear). Star gear 38 orbits about sun gear 42 as it spins between sun gear 42 and ring gear 40.

Pump 44 is coupled to and is driven by fan shaft 34 via pump gear 46 such that pump 44 can operate whenever fan shaft 34 is rotating. Pump 44 supplies a lubricating liquid, such as oil, to lubricate components such as gears and bearings of fan drive gear system 36. Fan drive gear system 36 benefits from a relatively continuous supply of lubricating liquid whenever fan shaft 34 is rotating. In an alternative embodiment, pump 44 can be an electrically driven oil pump. At least some of the lubricating liquid supplied to fan drive gear system 36 drains to sump 48 and is eventually pumped back through pump 44. Gutter system 49 is positioned circumferentially around fan drive gear system 36 to catch and collect a portion of the lubricating liquid that drips or is slung off fan drive gear system 36, as further explained below.

Figure 2:
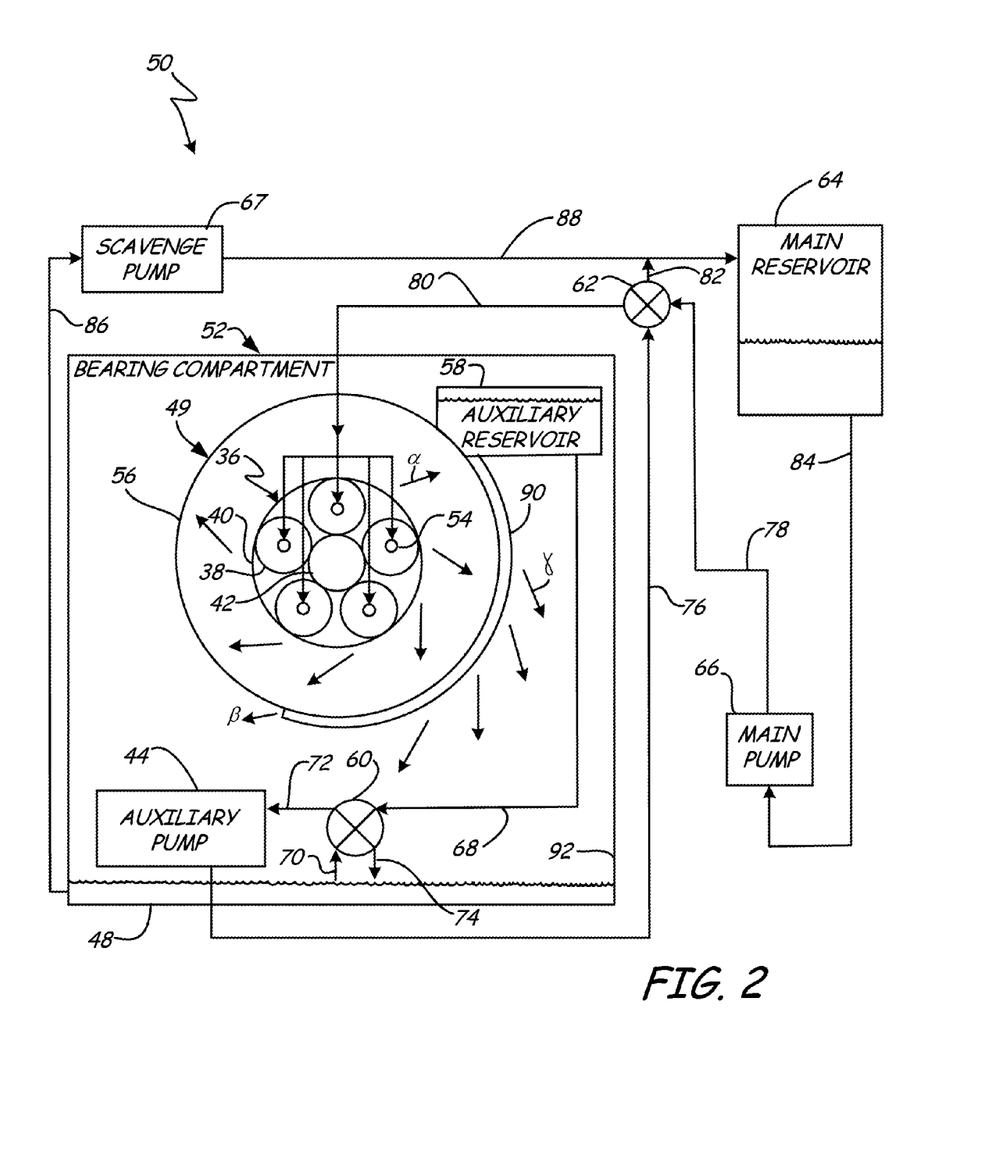
FIG. 2 is a schematic view of a pump system for use in the gas turbine engine of FIG. 1.

FIG. 2 is a schematic view of pump system 50. Pump system 50 includes bearing compartment 52 having a compartment cavity that contains fan drive gear system 36 (including bearings 54), auxiliary pump 44, gutter system 49 (including gutter 56 and passage 90), auxiliary 3 reservoir 58, and first shuttle valve 60. Pump system 50 also includes second shuttle valve 62, main reservoir 64, main pump 66, and scavenge pump 67 positioned outside of bearing compartment 52. Passages 68, 70, 72, 74, 76, 78, 80, 82, 84, 86, 88, and 90 connect the various components as illustrated and as further described, below.

As fan drive gear system 36 spins, lubricating liquid drips or is slung off fan drive gear system 36 into bearing compartment 52 in different directions, illustrated by arrows α. A portion of that liquid is caught and collected by gutter 56 and funneled to auxiliary reservoir 58. During normal operating conditions, auxiliary reservoir 58 is kept substantially full of liquid for later use. In one embodiment, auxiliary reservoir 58 contains enough liquid to provide adequate lubrication for fan drive gear system 36 for a specified amount of time. Liquid in excess of that required by auxiliary reservoir 58 is delivered to bypass passage 90 and ultimately to main scavenge passage 86. Gutter system 49 has a series of holes (illustrated in FIG. 5) that allows lubricating liquid to pass in directions illustrated by arrows γ and β toward wall 92 of bearing compartment 52.

Gutter 56 does not collect all liquid leaving fan drive gear system 36. The remaining liquid that is not collected by gutter 56 falls to sump 48, which is an open-top reservoir at a bottom of bearing compartment 52. Bearing compartment 52 can be sealed to reduce liquid flow out of bearing compartment 52, except through designated passages as herein described.

Second shuttle valve 62 is fluidically connected to auxiliary pump 44 via passage 76, to main pump 66 via passage 78, to bearings 54 via passage 80, and to main reservoir 64 via passages 82 and 88. Second shuttle valve 62 selectively directs fluid flow from auxiliary pump 44 or main pump 66 to bearings 54. Main reservoir 64 is further connected to main pump 66 through passage 84. Scavenge pump 67 is connected to sump 48 via main scavenge passage 86 and to main reservoir 64 via passage 88. Scavenge pump 67 pumps a portion of the liquid in sump 48 to main reservoir 64 for use by main pump 66. (See US Pregnant Publication No. 2010/0294597 entitled "Windmill and Zero Gravity Lubrication System" published Nov. 25, 2010 and assigned to the same assignee as this application for a more detailed description of the function of second shuttle valve 62).

First shuttle valve 60 is fluidically connected to auxiliary reservoir 58 via passage 68, to sump 48 via passage 70, to auxiliary pump 44 via passage 72, and again to sump 48 via passage 74. As part of pump system 50, first shuttle valve 60 and second shuttle valve 62 work together as a valve system. This valve system directs lubricating liquid to bearings 54 from one of sump 48, auxiliary reservoir 58, or main reservoir 64. When engine operating conditions prevent main pump 66 from supplying adequate liquid, second shuttle valve 62 switches from main pump 66 to auxiliary pump 44. Switching to auxiliary pump 44 can be beneficial if it has an adequate supply of liquid from first shuttle valve 60 during all gravity conditions. (See US Pregnant Publication No. 2010/0294371 entitled "Gravity Operated Valve" published Nov. 25, 2010 and assigned to the same assignee as this application for a more detailed description of the function of first shuttle valve 60).

Figure 3:
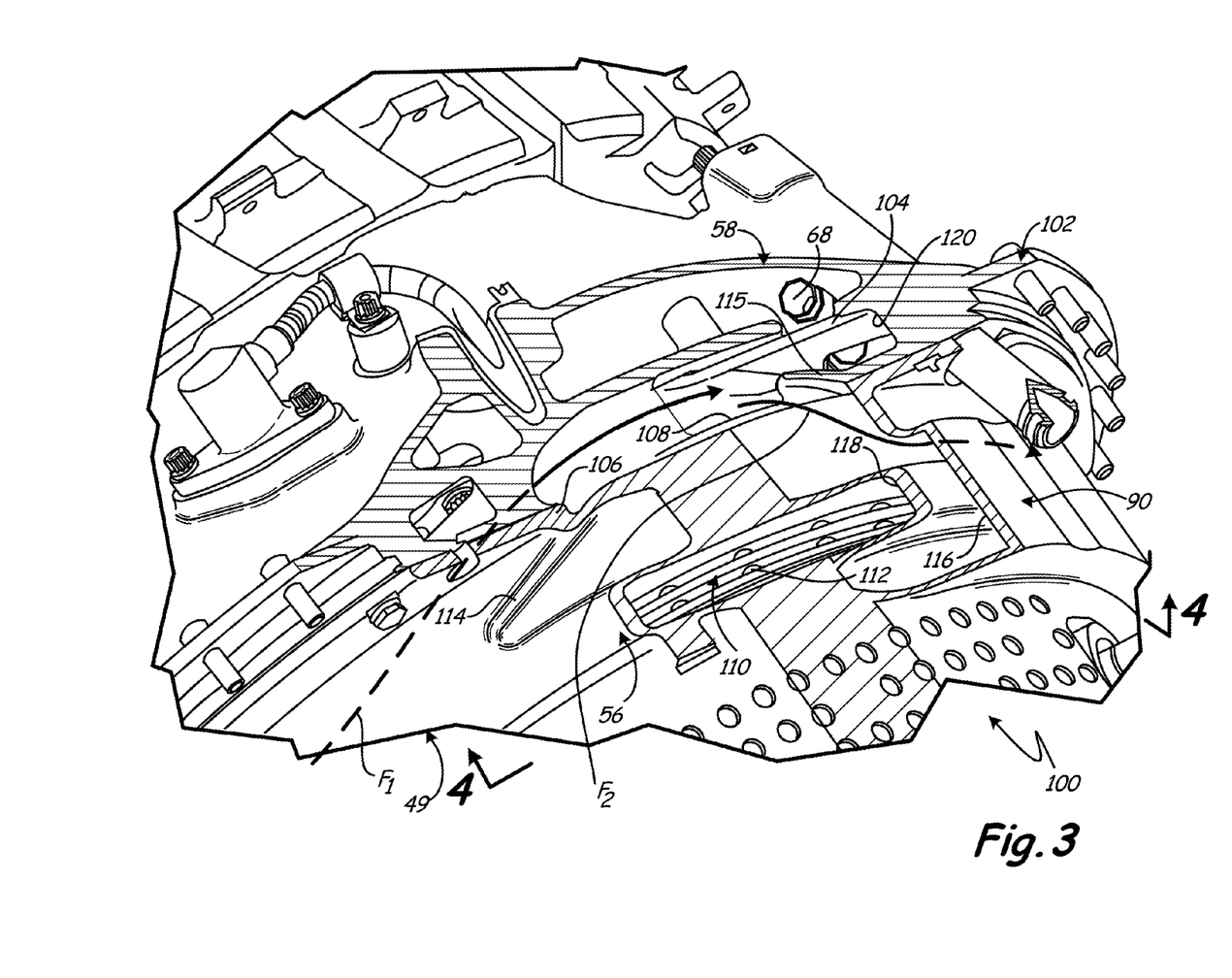
FIG. 3 is a partial perspective view of an oil capture and bypass system with a portion cut away above line 3-3 in FIG. 4.

FIG. 3 is a partial perspective view of oil capture and bypass system 100. In order to show greater detail in FIG. 3, a portion of oil capture and bypass system 100 has been cut away and removed above line 3-3 in FIG. 4. Oil capture and bypass system 100 includes gutter 56, auxiliary reservoir 58, and bypass passage 90. In the illustrated embodiment, auxiliary reservoir 58 is integrally formed with, and exists completely inside, bearing support 102. Bearing support 102 supports No. 1 and No. 1.5 bearings (not shown) of fan shaft 34 (shown in FIG. 1). Bearing support 102 includes sub-supports 104 that are positioned inside auxiliary reservoir 58, without substantially restricting flow within auxiliary reservoir 58. Auxiliary reservoir 58 has reservoir inlet 106 positioned relatively near reservoir outlet 108.

Gutter 56 is positioned radially outward from centerline axis $C_L$ (shown in FIG. 1) and extends circumferentially around fan drive gear system 36 (shown in FIGS. 1 and 2) for capturing lubricating liquid slung from fan drive gear system 36. A portion of gutter 56 is cut away to show flange 110. Flange 110 is connected to ring gear 40 (shown in FIGS. 1 and 2). The lubricating liquid from fan drive gear system 36 is slung through holes 112 in flange 110 into gutter 56. The lubricating liquid then slides around gutter 56 until it gets to gutter exit channel 114.

When auxiliary reservoir 58 is substantially empty, lubricating liquid from gutter 56 fills auxiliary reservoir 58. When auxiliary reservoir 58 is substantially full, excess lubricating liquid hits a "wall" of liquid and is then forced through reservoir outlet 108 into bypass passage 90 with the aid of diverter 115 which acts as a scoop to capture the excess liquid. Flow arrow $F_1$ generally illustrates the direction of flow through reservoir inlet 106. Flow arrow $F_2$ generally illustrates the direction of flow through reservoir outlet 108.

In the illustrated embodiment, gutter 56 and bypass passage 90 are integrally formed as gutter system 49 and can be cast as a single piece. Exterior wall 118 of gutter 56 is essentially a shared wall between gutter 56 and bypass passage 90. Because gutter system 49 abut directly to auxiliary reservoir 58, the connections can be made without a separate intervening connector pipe and without the losses in flow energy associated therewith. This configuration allows gutter 56 and auxiliary reservoir 58 to be substantially side-by-side.

Figure 4:
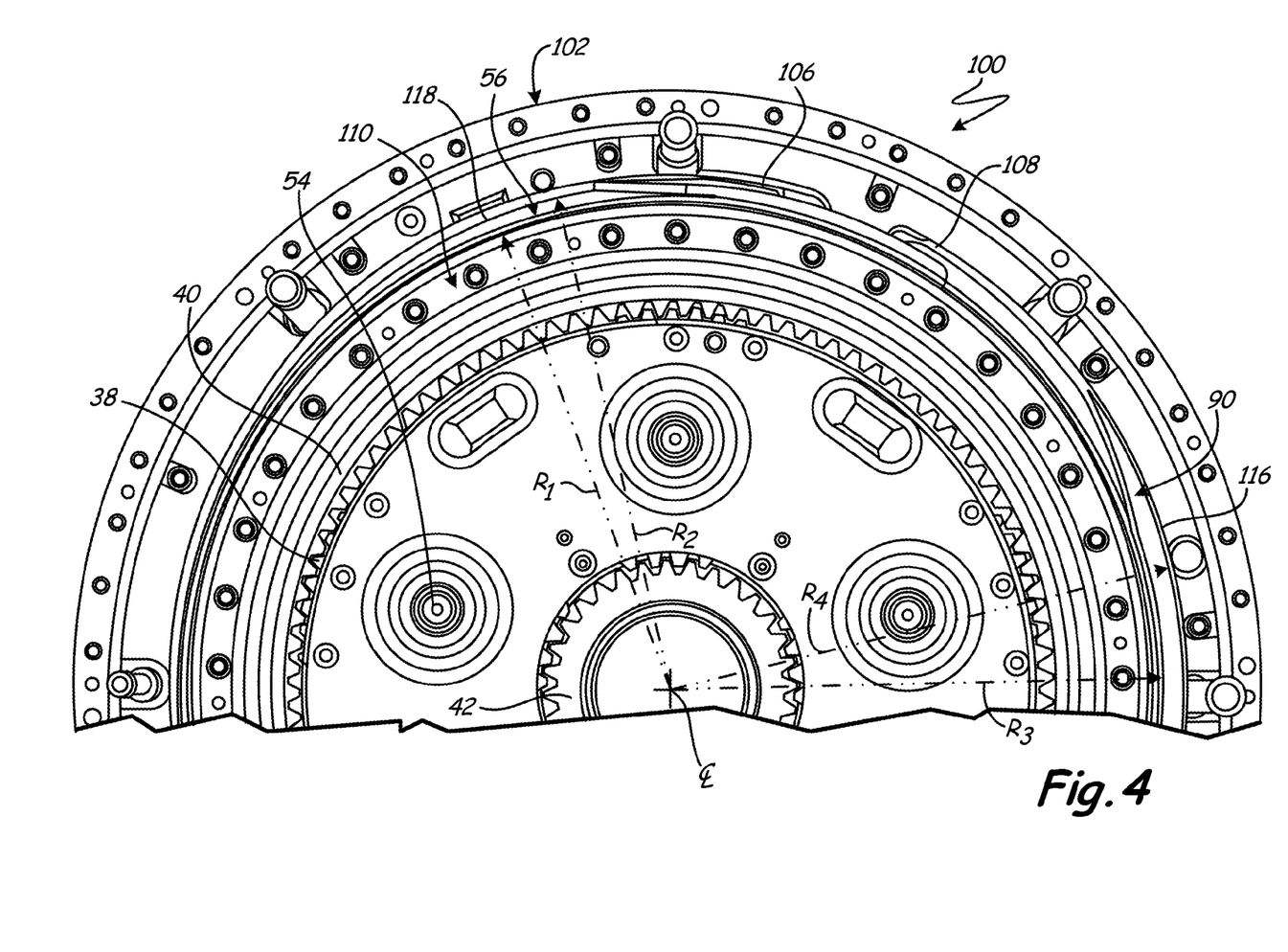
FIG. 4 is a partial sectional elevation view of an upper portion of the oil capture and bypass system taken along line 4-4 in FIG. 3.

FIG. 4 is a partial sectional elevation view of a portion of oil capture and bypass system 100 taken along line 4-4 in FIG. 3. The view of FIG. 4 is from the aft of gas turbine engine 10 (shown in FIG. 1) looking forward along centerline axis $C_L$. Gutter inner radius R1 extends from centerline axis $C_L$ to an inner diameter of gutter 56. Gutter outer radius $R_2$ extends from centerline axis $C_L$ to exterior wall 118 at an outer diameter of gutter 56. Bypass passage inner radius $R_3$ extends from centerline axis $C_L$ to an inner diameter of bypass passage 90. Bypass passage outer radius $R_4$ extends from centerline axis $C_L$ to exterior wall 116 at an outer diameter of bypass passage 90. Bypass passage inner radius $R_3$ is about the same as gutter inner radius $R_1$. There is a gap between exterior wall 116 and exterior wall 118 such that a portion of bypass passage 90 is radially outward from gutter 56 but other portions of bypass passage 90 are on both sides of gutter 56, having the same radial distance from centerline axis $C_L$ as a portion of gutter 56. Auxiliary reservoir 58 (shown in FIG. 3) is obscured in FIG. 4; however, the radius from centerline axis $C_L$ to exterior wall 120 (shown in FIG.

3) of auxiliary reservoir 58 is about the same as $R_2$. This configuration allows oil capture and bypass system 100 to have a relatively small maximum radius. The respective radii of the various elements need not, however, be precisely as illustrated.

Figure 5:
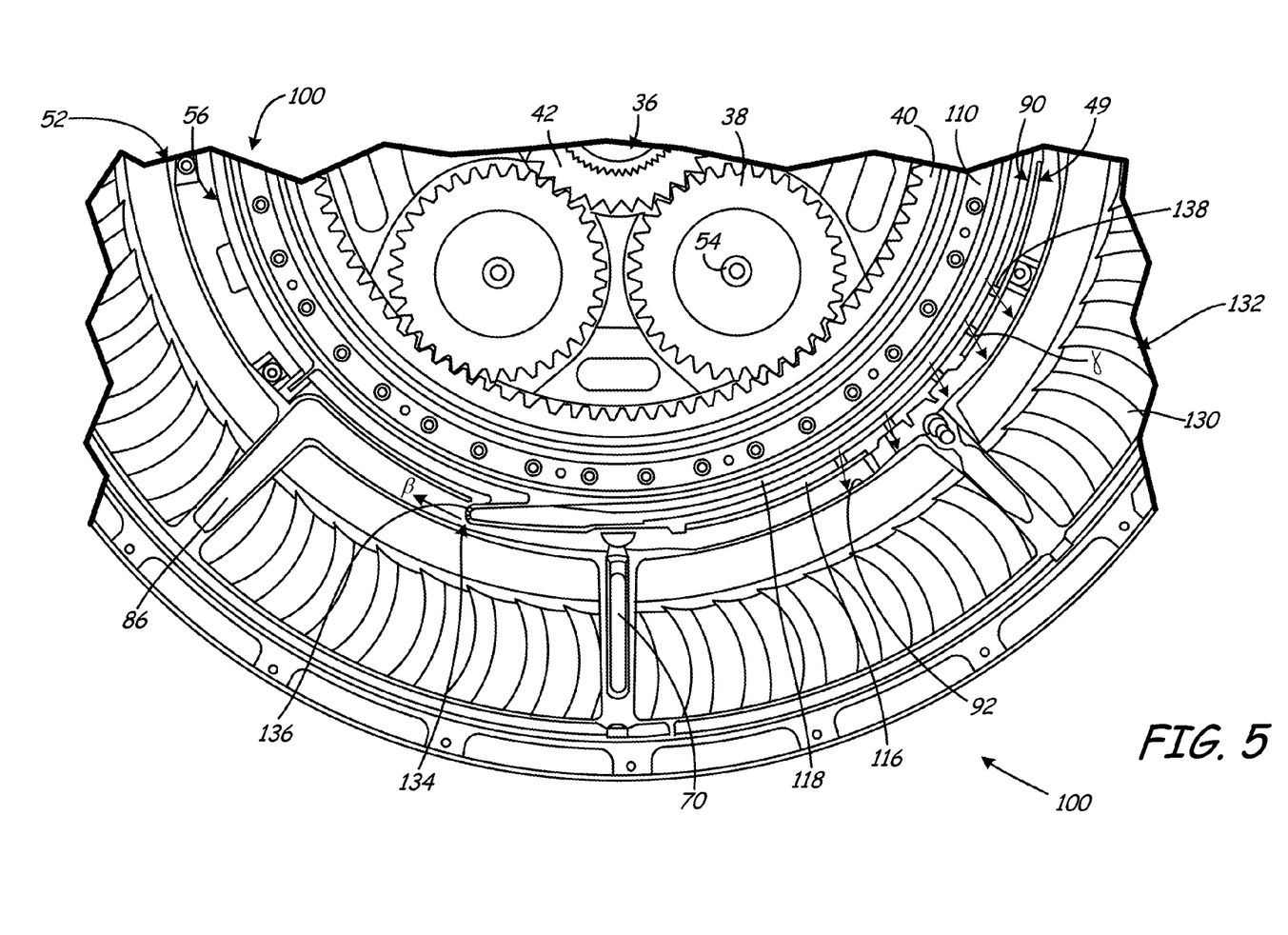
FIG. 5 is a partial sectional elevation view of a lower portion of the oil capture and bypass system taken along line 5-5 in FIG. 1.

FIG. 5 is a partial sectional elevation view of a lower portion of oil capture and bypass system 100 taken along line 5-5 in FIG. 1. FIG. 5 shows fan drive gear system 36, which is surrounded by gutter system 49 of oil capture and bypass system 100, which is surrounded by wall 92 of bearing compartment 52, which is surrounded by a plurality of inlet guide vane blades 130 of inlet guide vane system 132.

Bypass passage 90 is bounded by wall 116 and wall 118 and terminates at metered restriction end 134. Aerated lubricating liquid flows through bypass passage 90 in a clockwise direction toward metered restriction end 134. Metered restriction end 134 has hole 136 to drain lubricating liquid after engine shut down in a direction illustrated by arrow β. Wall 116 also includes a plurality of holes 138. Holes 138 allow aerated lubricating liquid to pass through in directions illustrated by arrows γ and contact wall 92 of bearing compartment 52. The action of being squirted from holes 138 against wall 92 causes aerated lubricating liquid to substantially deaerate. Deaerated lubricating liquid from holes 138 continue to flow in a clockwise direction through a space between gutter system 49 and wall 92 to main scavenge passage 86 to be scavenged by scavenge pump 67 (shown in FIG. 2). Scavenge pump 67 creates a suction to pull lubricating liquid through main scavenge passage 86 and return it to main reservoir 64 (shown in FIG. 2). By removing air from the lubricating liquid, scavenge pump 67 can pump the lubricating liquid more efficiently.

In the illustrated embodiment, each of holes 138 extend through wall 116 of bypass passage 90 at locations vertically higher than the lowest position of wall 116. Wall 116 of bypass passage 90 curves circumferentially with respect to centerline axis $C_L$ (shown in FIGS. 1 and 4). This curvature forces aerated lubricating liquid traveling clockwise through bypass passage 90 to curve. This orientation also forces a substantial amount of lubricating liquid to pass through holes 138 and be deaerated upon impact with wall 92. Because the lubricating liquid has a relatively high velocity when it strikes wall 92, the amount of air in the aerated lubricating liquid is decreased.

FIG. 6 shows a revised gutter system 200 which may be otherwise similar to the gutter system described above and used in place thereof.

In the forward-looking view of FIG. 6, the fan shaft assembly 202 rotates in a clockwise direction 520.

Figure 6A:
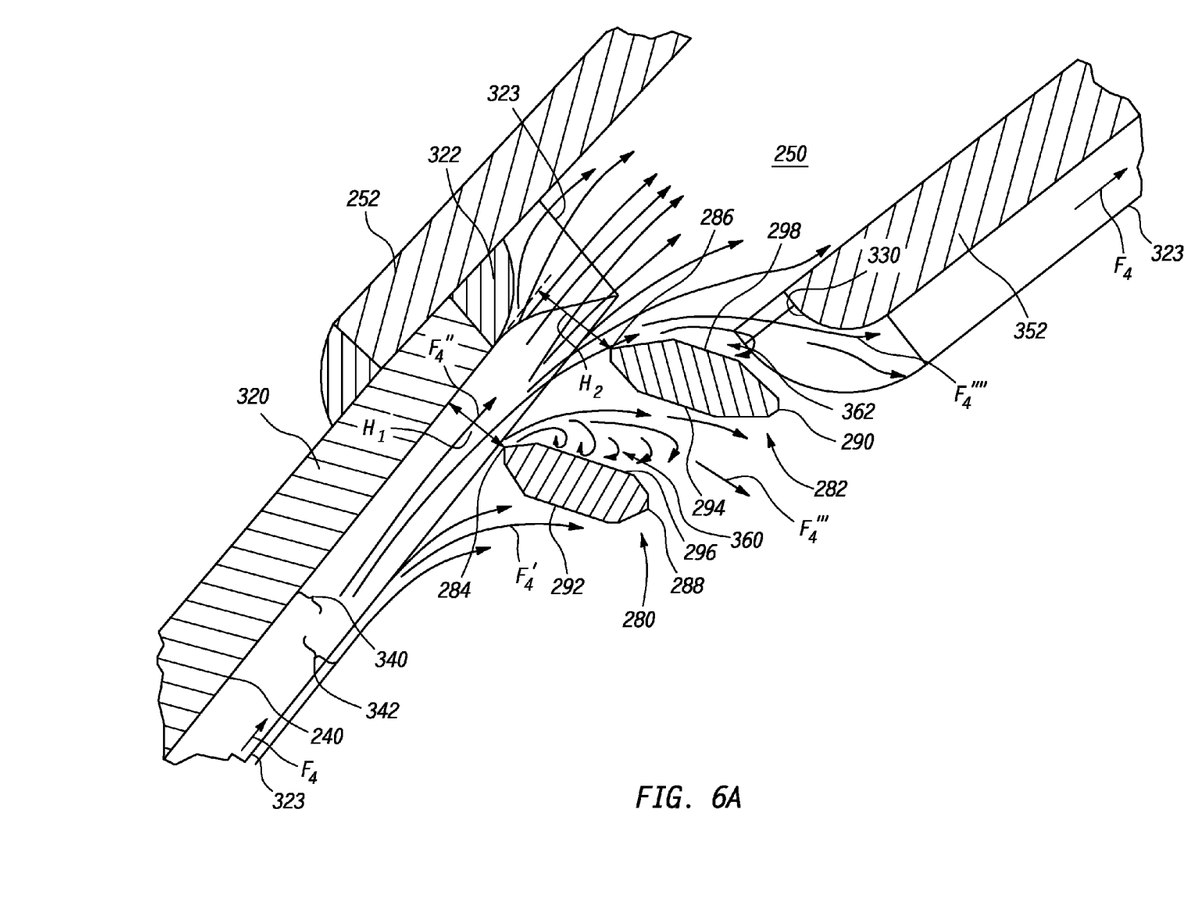
FIG. 6A is an enlarged view on an inlet region of the system of FIG. 6.
Figure 7:
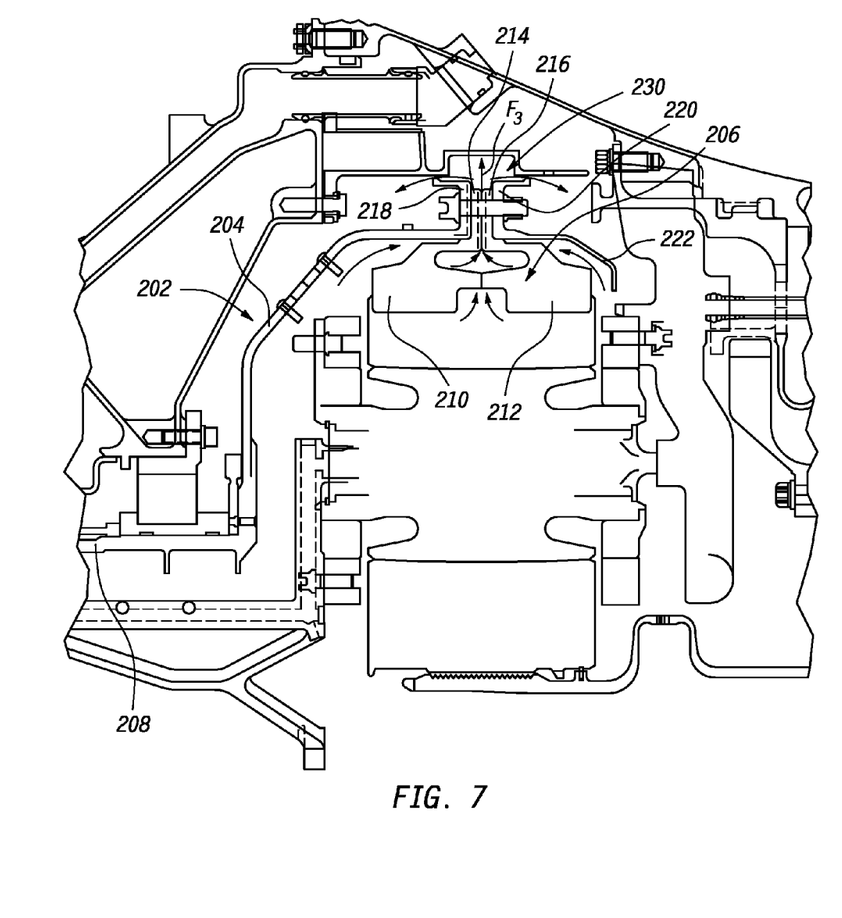
FIG. 7 is a longitudinal cutaway view of the system of FIG. 6 taken along line 7-7 of FIG. 6.

FIG. 7 shows the fan shaft assembly 202 as including a forward hub/scoop 204 at the front of the fan drive gear system coupling the ring assembly 206 to the main fan shaft section 208. The ring gear assembly 206 comprises a forward half 210 and an aft half 212 each having a radially inboard gear-engaging toothed portion and a radially outboard flange 214, 216. The flanges 214, 216 are sandwiched between and bolted to a flange 218 of the hub 204 forward and a flange 220 of an aft oil scoop 222. Holes 226 (formed by mated complementary channels in the facing surfaces of the flanges 214 and 216) sling oil flows $F_3$ outward into the interior 230 of the gutter channel. With the ring gear rotating in the direction 520 in FIG. 6 the flow $F_3$ is slung with a tangential component in that direction 520. The slung flow encounters the inboard surface 240 of the outer wall along the channel 230 and forms a circumferential flow $F_4$ (FIG. 6A).

Figure 8:
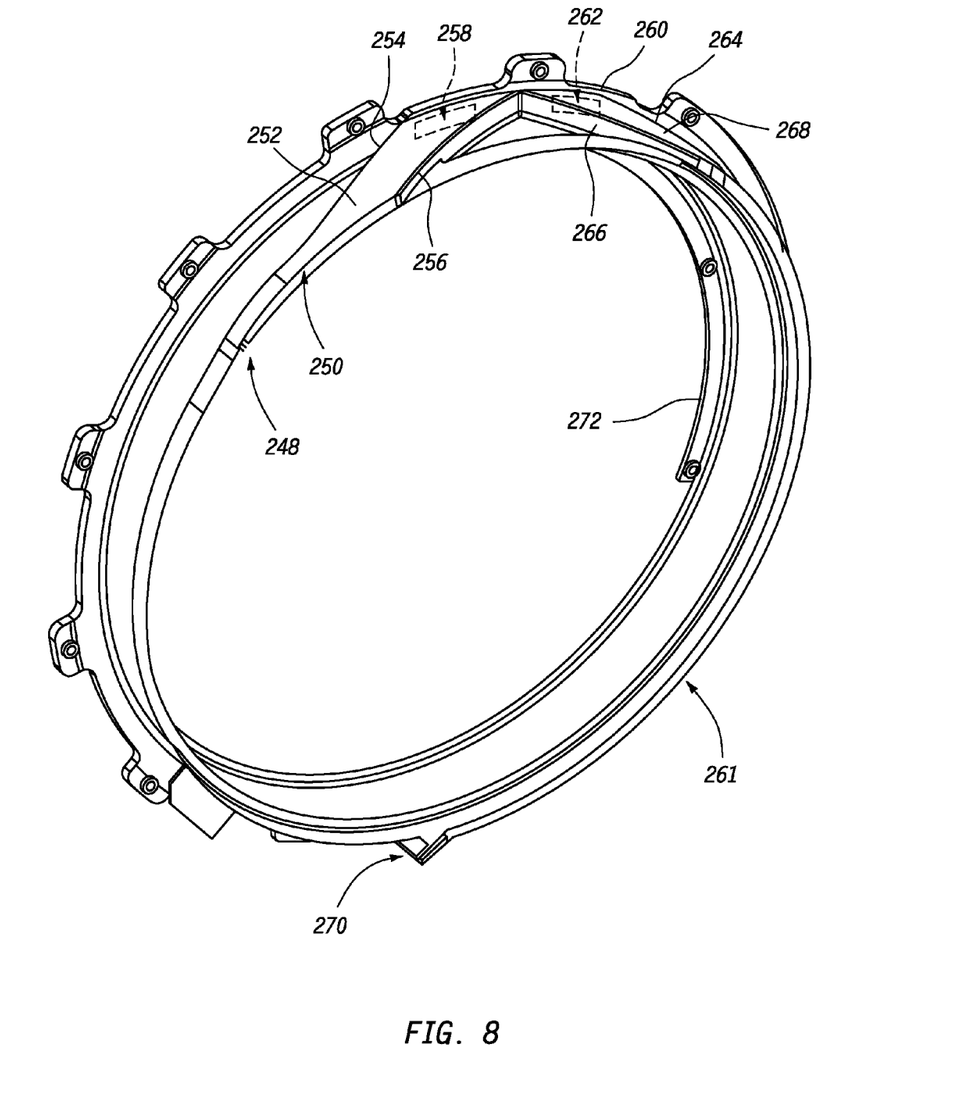
FIG. 8 is an isolated view of the gutter of the system of FIG. 6.

Eventually the flow $F_4$ reaches an inlet 248 (FIG. 8) to an inlet channel 250. FIG. 8 is an isolated view of the gutter assembly showing the inlet 248 to the inlet channel 250. FIG. 8 also shows an outer cap 252 of the inlet channel. The inlet channel 250 diverts forward and has a forward lateral wall 254 and an aft lateral wall 256. An inlet channel outlet 258 is along a gutter outer/outboard flange 260. Similarly, the bypass channel 261 has an inlet 262 along the flange 260 and has a forward wall 264 and an aft wall 266 and a cap 268. The bypass channel extends circumferentially to an outlet nozzle 270 generally near the bottom of the gutter. FIG. 8 also shows an interior/inboard flange 272 of the gutter.

As the flow $F_4$ approaches the inlet 248, it encounters a pair of splitter vanes 280, 282 (FIG. 6A). Each splitter vane has an outboard edge 284, 286 and an inboard edge 288, 290. The exemplary vanes also have a leading surface 292, 294 generally facing the flow $F_4$ and a trailing surface 296, 298. FIGS. 9-12 also show the vanes extending generally longitudinally from a forward end at forward wall 300 of the inlet channel to an aft end at an aft wall 302 of the inlet channel. Turning to FIG. 6A, the first vane 280, outboard edge 284 is spaced apart from the inner surface 240 along the channel scroll portion 320 of the outer wall by a gap having a height $H_1$. The channel scroll terminates circumferentially at an inboard weld 322 to the inlet cap 252 attached to an outboard surface of the channel scroll. Various weld fillet edges are labeled 323.

The exemplary outboard edge 286 of the second vane 282 is slightly radially recessed relative to the outboard edge 284 so that a height $H_2$ between the edge 286 and a projection of the surface 240 is greater than $H_1$.

Due to centrifugal action, the flow $F_4$ is radially stratified with a relatively lubricant (oil)-rich strata 340 near the wall progressively transitioning through a more gas-rich (air-rich/oil-poor) strata 342 radially inboard thereof. The vane 280 is positioned so that the outboard edge 284 falls between these strata so that the air-rich portion $F_4'$ is diverted radially inboard by the vane. In the exemplary embodiment, this diversion preserves a tangential component of the diverted flow in the direction 520 allowing a smooth continuation of the tangential flow $F_4$ along the surface 240 along the main splitter 352. Thus, the exemplary leading surface 292 and a chord between the leading edge 284 and trailing edge 288 are oriented generally with a slight radially inward component (rather than radially outward component) facing the oncoming tangential flow. This is contrasted with a hypothetical alternative diverting the redirected flow back opposite the direction 520.

Diversion of the relatively air-rich portion $F_4'$ leaves a more oil-rich portion $F_4''$ to pass circumferentially past the first vane 280 outboard thereof. Yet a further portion $F_4'''$ will pass radially inward between the vanes. This further portion $F_4'''$ will join with the flow $F_4''''$. FIG. 6A shows this further portion $F_4'''$ as flowing relatively smoothly near the leading surface 294 of the second vane but near the trailing surface 296 of the first vane there will be recirculation in a zone 360. The recirculation zone 360 slows the oil/air mixture which allows the air to separate easier from the oil/air mixture and the concentrated oil of the mixture to continue above (outboard of) the first vane onto the second vane and into the inlet channel. The air-majority mixture flow continues along the vane and reunites with the flow $F_4'$ and $F_4$. Flow $F_4''''$ passes between the trailing surface 298 of the second vane and the leading edge 330 of a main splitter portion 352 of the gutter channel (edge 330 forming a first circumferential end edge of the gutter). A recirculation zone 362 is similarly behind the second vane and affects the flow passing behind the second vane. Thus, the recirculation zone 362 facilitates the air rich portion F"" separating from a remaining oil-rich portion. The remaining oil-rich portion of the flow then passes into and through the inlet channel.

In the exemplary implementation, the relatively greater spacing $H_2$ versus $H_1$ is associated with a slowing of the oil-rich flow. The presence of the first vane tends to slow the flow passing beyond it and, therefore, increase the radial layer thickness of the oil-rich flow. Accordingly, the second vane is spaced farther away from the surface 240 (or its projection) to maintain a similarly selective diversion of air-rich flow.

Manufacture of the gutter may be by generally conventional techniques. For example, an initial precursor may be formed by casting or a rapid prototyping method (e.g., direct metal laser sintering (DMLS)). The precursor may include the inlet and bypass channels (absent caps), scavenge baffle, aft baffle holes, vanes, and bypass channel holes. The precursor may then be machined to form or refine features such as the flange and bushing holes. After machining, caps (e.g., pre-made by machining or laser cutting) may be welded in place.

One alternative would be to have a fully fabricated part with a multitude of individual pieces machined and welded together. A potential combination would be to have the main body and channel cast and then weld machined caps onto the channel and then either have the vanes cast in or machined then welded.

The exemplary cross-sectional profiles of the vanes are shown as slightly eccentric elongated hexagons. Alternative cross-sections may be oval or elliptical, trapezoidal, or airfoil shaped. There may be more or fewer than two such features and more complex features might be provided.

One or more embodiments have been described. Nevertheless, it will be understood that various modifications may be made. For example, when implemented in the reengineering of a baseline engine, details of the baseline may influence details of any particular implementation. Accordingly, other embodiments are within the scope of the following claims.

What is claimed is:

1. A gutter system for capturing lubricating fluid slung from a gear system comprising:
    a gutter extending partially circumferentially about a centerline and having a gutter first circumferential end edge;
    an inlet channel having an inlet at the gutter first circumferential end edge and locally radially outboard of the gutter; and
    at least one vane spaced apart from the gutter first circumferential end edge, the at least one vane positioned with a chord oriented with a component from an outboard edge to an inboard edge circumferentially in the same direction as an inlet flow direction, so as to pass a first portion of a lubricating fluid flowing along a gutter inboard surface into the inlet of the inlet channel and divert a second portion away from the inlet.

2. The gutter system of claim 1 wherein:
the at least one vane is exactly two vanes.

3. The gutter system of claim 1 wherein:
the at least one vane is at least two vanes.

4. The gutter system of claim 3 wherein:
the at least two vanes are positioned with a leading vane and a trailing vane, the leading vane having an outboard edge and the trailing vane having an outboard edge radially recessed relative to the leading vane outboard edge.

5. The gutter system of claim 4 wherein:
the trailing vane is spaced apart from both the leading vane and away from the gutter first circumferential end edge.

6. The gutter system of claim 4 wherein:
the leading vane and trailing vane are spaced apart from each other and the gutter first circumferential end edge by 1-4 times a thickness of the trailing vane.

7. An engine comprising:
an engine case, the engine case defining a centerline and a gaspath within the engine case;
a shaft;
a fan coupled to a fan shaft;
a transmission coupling the shaft to the fan shaft to drive the fan and comprising a gear system; and
the gutter system of claim 1 positioned to capture said lubricating fluid slung from the gear system.

8. The engine of claim 7 wherein:
the transmission is an epicyclic transmission.

9. The engine of claim 7 wherein:
the gutter comprises a flange;
the engine comprises an auxiliary lubricant tank; and
an outlet of the inlet channel to the auxiliary lubricant tank is along the flange.

10. The engine of claim 7 wherein:
the at least one vane is oriented to inwardly deflect a tangential flow passing along a leading face without tangentially reversing the flow.

11. The engine of claim 7 wherein:
the engine has at least one compressor section, a combustor, and at least one turbine section; and
the shaft is coupled to the turbine section.

12. The engine of claim 11 wherein:
the at least one compressor section comprises a high pressure compressor section and a low pressure compressor section;
the at least one turbine section comprises a high pressure turbine section and a low pressure turbine section;
the shaft is a low pressure turbine shaft coupling the low pressure turbine section to the low pressure compressor section; and
a high pressure shaft couples the high pressure turbine section to the high pressure compressor section.

13. A method for operating the gutter system of claim 1 wherein:
the lubricating fluid is flung with a tangential/circumferential velocity component in a first direction;
a portion of the flung lubricating fluid flows in the first direction along an inboard surface of the gutter; and
a portion of the lubricating fluid flowing along the gutter inboard surface passes into the inlet of the inlet channel.

14. The method of claim 13 wherein:
as the portion of the lubricating fluid flowing along the gutter inboard surface passes into the inlet of the inlet channel a first of the the at least one vane diverts a relatively air-rich portion away from the inlet and then a second of the the at least one vane diverts a relatively air-rich portion of the remainder away from the inlet.

15. A gutter system for capturing lubricating fluid slung from a gear system comprising:
a gutter extending partially circumferentially about a centerline and having a first circumferential end edge;

an inlet channel having an inlet at the gutter first circumferential end edge and locally radially outboard of the gutter; and means circumferentially ahead of the first circumferential end edge for diverting gas from a tangential flow of the slung lubricating fluid, wherein:

the means comprises at least one vane positioned to divert a relatively gas-rich inboard portion of the tangential flow from a relatively gas-poor outboard portion;

the vane is positioned to pass said relatively gas-poor outboard portion to the inlet where a relatively gas-rich portion thereof is diverted by the first circumferential end edge so that a relatively gas-poor portion thereof is passed through the inlet.

16. An engine comprising;

the gutter system of claim 15;

an engine case, the engine case defining a centerline and a gaspath within the engine case;

a shaft;

a fan coupled to a fan shaft; and a transmission coupling the shaft to the fan shaft to drive the fan and comprising a gear system.

17. A method for operating gutter system for capturing lubricating fluid slung from a gear system, said gutter system comprising;

a gutter extending partially circumferentially about a centerline and having a gutter first circumferential end edge;

an inlet channel having an inlet at the gutter first circumferential end edge and locally radially outboard of the gutter; and at least one vane spaced apart from the gutter first circumferential end edge, wherein:

the lubricating fluid is flung with a tangential/circumferential velocity component in a first direction;

a portion of the flung lubricating fluid flows in the first direction along an inboard surface of the gutter;

an oil-rich portion of the lubricating fluid flowing along the gutter inboard surface passes into the inlet of the inlet channel; and a recirculation zone behind the vane facilitates separation of an air-rich portion from the oil-rich portion.

18. A method for operating a gutter system for capturing lubricating fluid slung from a gear system wherein:

the gutter system comprises:

a gutter extending partially circumferentially about a centerline and having a gutter first circumferential end edge;

an inlet channel having an inlet at the gutter first circumferential end edge and locally radially outboard of the gutter; and at least one vane spaced apart from the gutter first circumferential end edge, the at least one vane positioned with a chord oriented with a component from an outboard edge to an inboard edge circumferentially in the same direction as an inlet flow direction;

the lubricating fluid is flung with a tangential/circumferential velocity component in a first direction;

a portion of the flung lubricating fluid flows in the first direction along an inboard surface of the gutter; and a portion of the lubricating fluid flowing along the gutter inboard surface passes into the inlet of the inlet channel;

as the portion of the lubricating fluid flowing along the gutter inboard surface passes into the inlet of the inlet channel the at least one vane diverts a relatively air-rich portion away from the inlet between a trailing surface of the at least one vane and the gutter end edge.

* * * * *